J. R. ARMSTRONG.
GAS METER.
APPLICATION FILED JAN. 14, 1910.

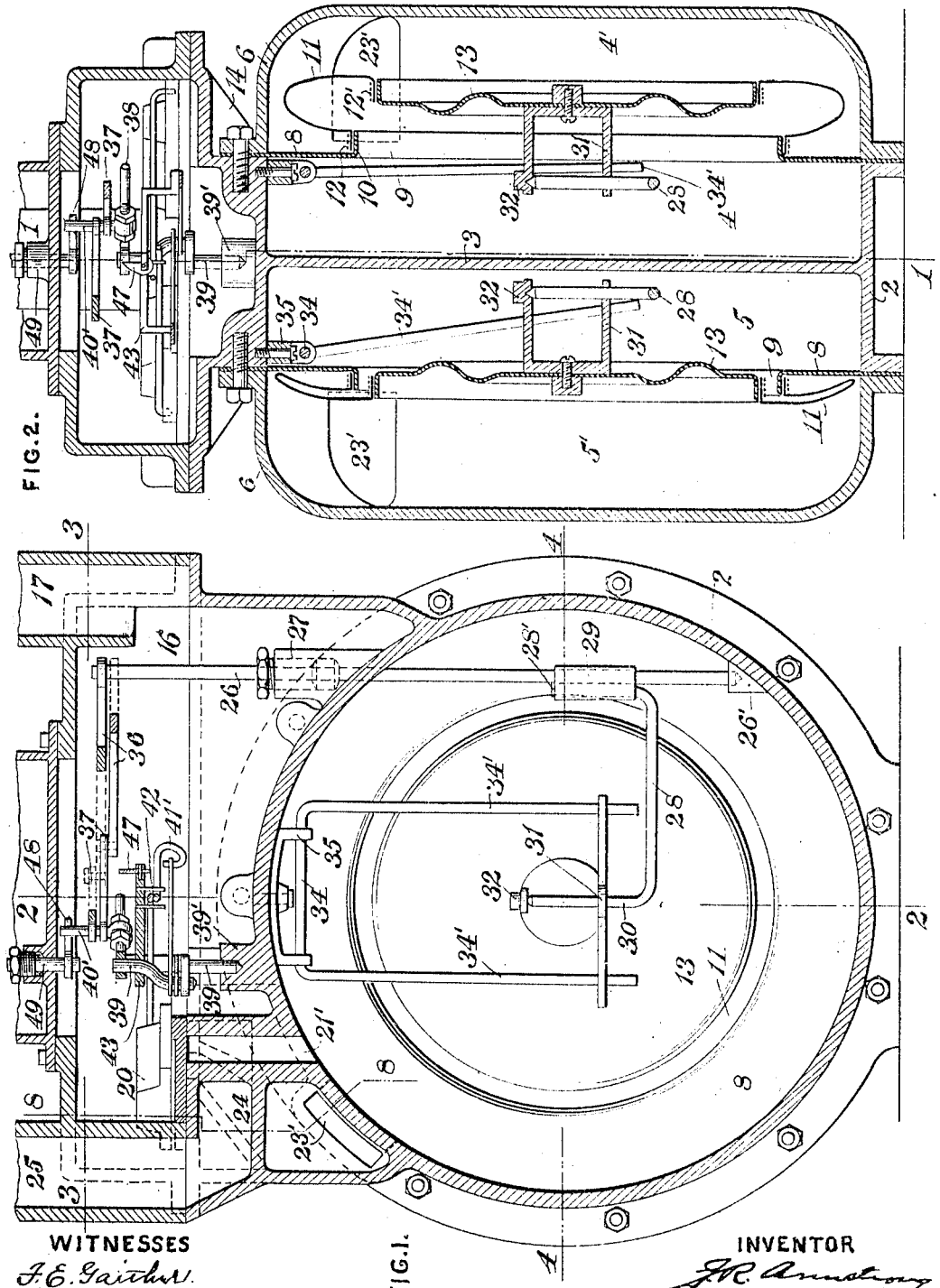

991,927.

Patented May 9, 1911.
4 SHEETS—SHEET 2.

WITNESSES

INVENTOR

J. R. ARMSTRONG.
GAS METER.
APPLICATION FILED JAN. 14, 1910.

991,927.

Patented May 9, 1911.

4 SHEETS—SHEET 3.

WITNESSES
F. E. Gaither
Ella McConnell

INVENTOR
J. R. Armstrong
By Jno. Nesbit
atty

J. R. ARMSTRONG.
GAS METER.
APPLICATION FILED JAN. 14, 1910.
991,927.
Patented May 9, 1911.
4 SHEETS—SHEET 4.
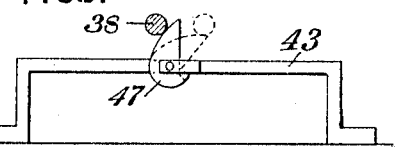
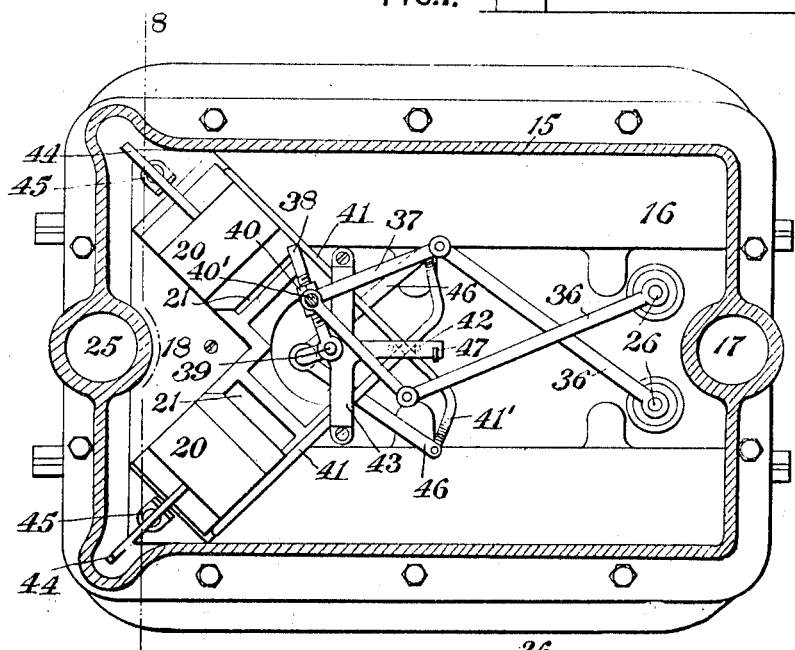
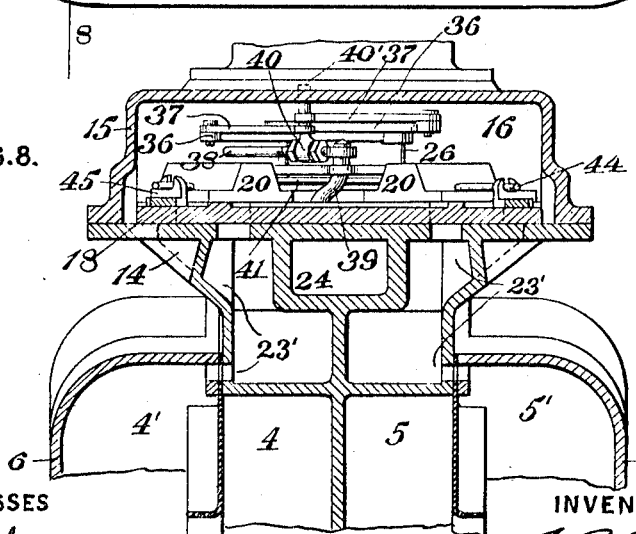
WITNESSES
INVENTOR

UNITED STATES PATENT OFFICE.

JAMES R. ARMSTRONG, OF PITTSBURG, PENNSYLVANIA, ASSIGNOR OF ONE-THIRD TO WILLIAM H. IRVIN, OF PITTSBURG, PENNSYLVANIA.

GAS-METER.

991,927.   Specification of Letters Patent.   Patented May 9, 1911.

Application filed January 14, 1910. Serial No. 537,995.

*To all whom it may concern:*

Be it known that I, JAMES R. ARMSTRONG, of Pittsburg, in the county of Allegheny and State of Pennsylvania, have invented certain new and useful Improvements in Gas-Meters, of which the following is a specification.

This invention relates to that type of gas meter wherein the flow to and from the measuring chambers is controlled by slide valves. In the present adaptation the improvements are applied to a double meter, i. e., one having two pairs of measuring chambers with a slide valve for each pair.

One object is to provide improved operating connections between the flag rods and the valves, the resulting advantages being fully stated hereinafter.

A further purpose is to improve the connections between the flag rods and the diaphragms, also improved means for preventing the diaphragms from oscillating while reciprocating between the measuring chambers.

Still a further object is to arrange the diaphragms in conjunction with rigid partitions separating the measuring chambers.

The invention includes improved automatic means for preventing the meter from running backward.

Figure 3:
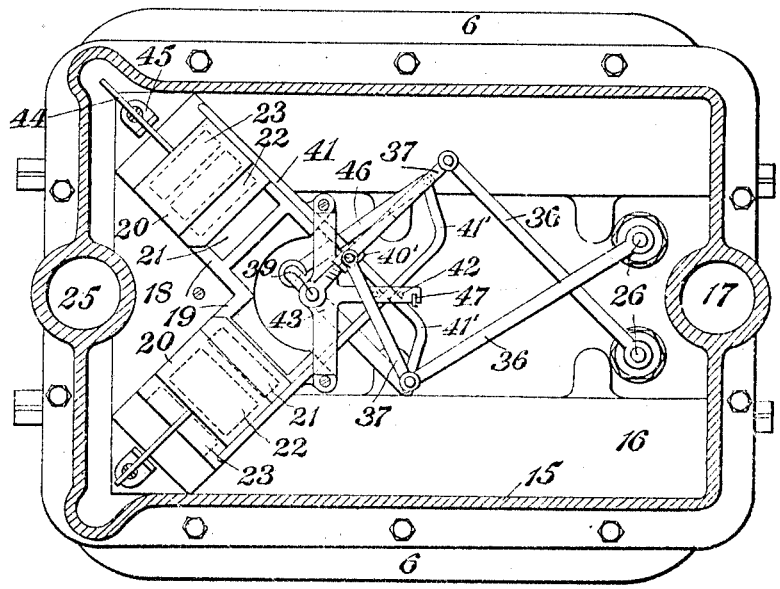
Figure 4:
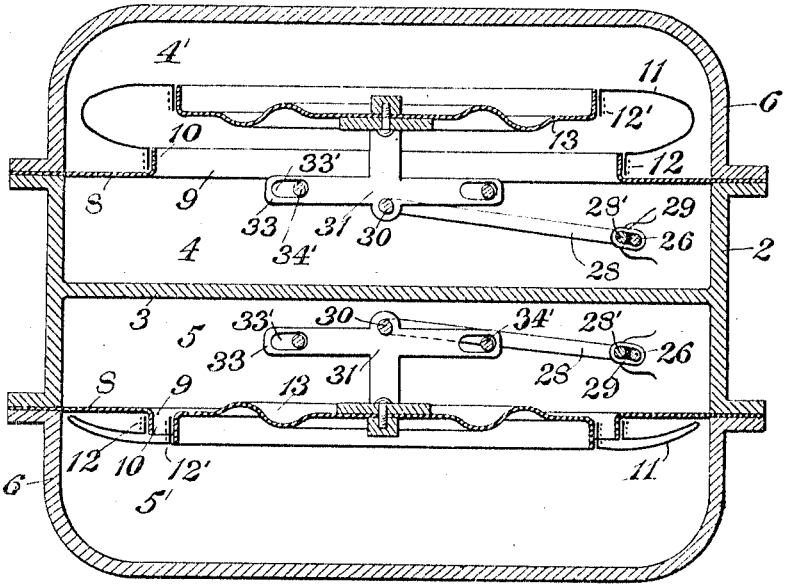
Figure 5:
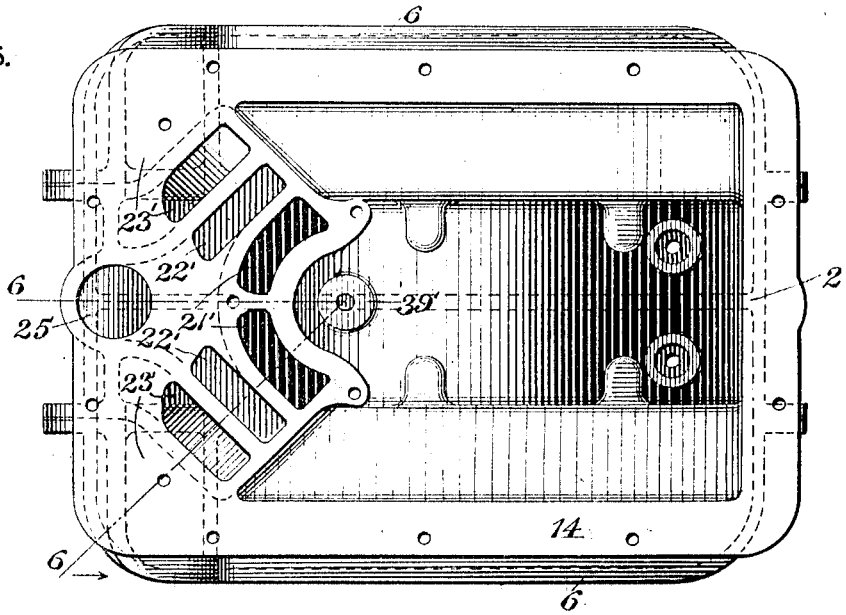
Figure 6:
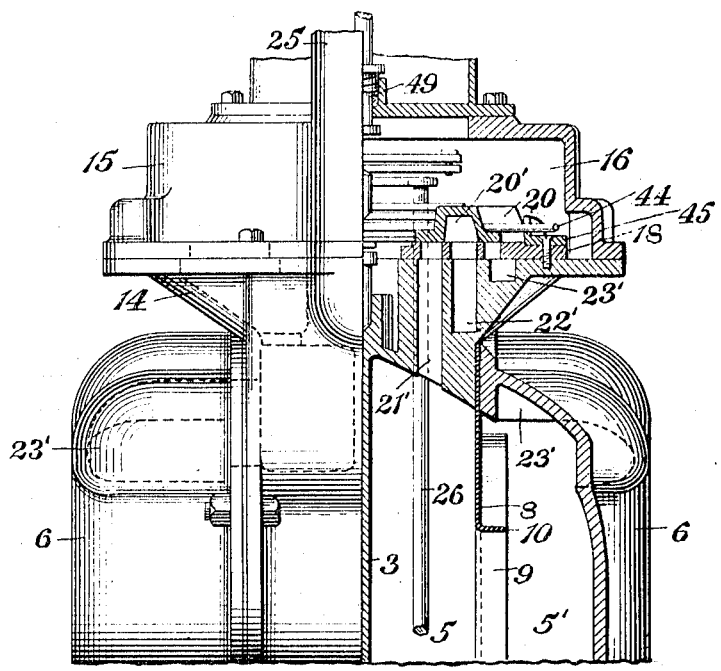

In the accompanying drawings, Figure 1 is a vertical longitudinal section of a meter embodying the invention, taken on line 1—1 of Fig. 2, and Fig. 2 is a cross-section on line 2—2 of Fig. 1. Figs. 3 and 4 are sectional plans on lines 3—3 and 4—4, respectively, of Fig. 1. Fig. 5 is a top plan of the casing with the delivery-chamber-inclosing top portion removed and the valve seat plate removed. In Fig. 6 half of the delivery side of the meter is shown in elevation and the other half on line 6—6 of Fig. 5. Fig. 7 is a view similar to Fig. 3 with the valves and actuating mechanism shown in a different position. Fig. 8 is a cross-section of the delivery side of the meter taken on lines 8—8 of Figs. 1 and 7. Fig. 9 is a detail of the latch for preventing backward movement.

As here shown the casing of the four-chamber meter consists of a substantially circular body portion 2, partitioned centrally at 3 to form the two inner measuring chambers 4 and 5, and with caps or heads 6 fitting and secured to the open sides of body 2 and inclosing the outer measuring chambers 4', 5', respectively. A pair of measuring chambers is thus provided at each side of partition 3, the chambers of each pair being separated by a rigid partition 8 secured in the joint between parts 2 and 6 and provided with a relatively large opening 9 having its edge flanged at 10. The diaphragm bellows 11 is secured to flange 10 by a wrapping 12, while a similar wrapping 12' secures the bellows to the diaphragm head 13. This head is smaller than opening 9 and may enter the same or pass therethrough as occasion may require.

Body 2 is extended upwardly from the circular casing formation as indicated at 14, and is broadened and lengthened and its top edge surfaced to receive the removable upper portion 15 of the meter casing, with the main portion of the space inclosed by part 15 forming a chamber 16 for delivering gas from inlet 17 to the measuring chambers. A plate 18 is secured in one end of chamber 16, and formed therein are the two valve seats 19 which converge toward inlet 17, and operative thereon are the two slide valves 20. Three ports 21, 22, and 23 are formed through each seat and communicate with ducts or ports extending to the several chambers as follows: Ports 21 communicate with ducts 21' which open straight downward into the inner measuring chambers 4 and 5, respectively. Ports 23 communicate with the tortuous ducts 23' extending to the outer measuring chambers 4' and 5', respectively. The intermediate ports 22 communicate with ducts 22' which lead to chamber 24, from which extends the outlet or discharge connection 25. Each of valves 20 is arched upwardly to provide a cavity 20' on its under side which establishes communication between the outlet port 22 and either port 21 or port 23, according to the position of the valve, for emptying either the inner or outer chamber of the pair of measuring chambers controlled thereby. While one chamber is thus emptying, the other chamber is filling from chamber 16 through the uncovered port 21 or 23, as the case may be.

The slide valves are actuated by flag rods 26, mounted in the inner measuring chambers 4 and 5 and extending vertically into delivery chamber 16, with their upper ends operatively connected to the valves. But before describing these connections I will refer to the manner of mounting said rods and their connections with the diaphragms.

Rods 26 are preferably straight and stand vertical with their lower ends supported in bearings 26' near the bottom of the measuring chambers, the rods extending upwardly through packing boxes 27 into chamber 16. These rods are preferably located adjacent the inlet side of the meter structure, being thus considerably to one side of the center of the diaphragms, to which they are connected by the laterally extending arms 28. In the present adaptation, each of these arms is of U-form, with the inner leg 28' thereof soldered or brazed to rod 26, sleeve 29 embracing the leg and rod and forming part of the essentially rigid connection. The outer leg 30 of arm 28, viewed in plan, is in line with the center of the diaphragm and extends upward loosely through guide 31 secured to the diaphragm, with its upper extremity engaged by bearing 32 also secured to the diaphragm. Parts 31 and 32 may be conveniently formed in one piece, as shown. The oppositely extending portions 33 of guide 31 are slotted at 33', and loosely entered in these slots are the depending arms 34' of the inverted U-shaped guide 34, suspended from bearings 35 at the top of the measuring chamber. As a result of this construction the diaphragm heads are supported against sagging by the free hinge or pivotal connection with the flag arms, this without interfering with the operation of said arms and without exerting any binding stress on the operating parts. The swinging guides 34 are entirely free of supporting strains such as would result if positively connected to the diaphragms, and as said guides each swing in a fixed path they hold the diaphragms from oscillating on flag-rod legs 30 as they move toward or from either chamber. And with the flag rods supported and guided both above and below their connections with the diaphgrams there can be no torsional strains.

I shall now describe the connections between the flag rods and the slide valves. Secured to the upper end of each rod is an arm 36, which arms in the present arrangement cross each other, with their free extremities connected by links 37 to crank arm 38 secured to the upper end of the relatively short crank shaft 39, the latter having bearing 39' at its lower end as shown. The connection between links 37 and arm 38 is by means of the adjusting device 40, whereby the speed at which the valves are moved may be varied.

A characteristic of the invention is the mode of connecting the slide valves to the operating crank shaft 39. In the present embodiment, a relatively long arm 41 is secured to the side of each valve, the arms being of sufficient length to cross each other owing to the convergence of the valves, and at the point where arms 41 cross they extend through a guide 42 on the under side of bridge member 43, and this guide, together with tail rods 44 working through guides 45 at the rear end of the valves, hold the latter on the valve seats and in correct alinement.

The extremities of arms 41 are bent or curved at 41' and connected by links 46 with the crank of shaft 39. By thus elongating and bending the arms and connecting them by links with the operating crank, as distinguished from an immediate connection between the latter and the valves, a substantially straight central pull or push results, there being no tendency to twist the valve on its seat and consequently no friction. A further and very important advantage is that with the connections wholly at the sides of the valves the ports are in no way obstructed, leaving a perfectly free and open passage for the gas.

Several advantages result from the novel connecting means between the flag rods and crank-shaft 39. With arms 36 crossing each other the flag rods may be straight, with bearings at their lower ends in chambers 4 and 5, and being straight there are no such torsional or twisting strains as result when bent or curved rods are used, as in meters of former design; also there is no binding in stuffing boxes 27. Also, the flag rods may be arranged quite close together without detracting from the necessary leverage, and being thus relatively close, the casting forming the central frame or body 2 may be narrower and hence less costly than heretofore. A further advantage is that the construction permits of relatively long crank-connecting links 37, with the result that one or the other of said links is always more nearly at right angles to crank-arm 38 than if the links were relatively short, thereby exerting a more direct push or pull on the crank. Also, with this construction when one of arms 36 and its link 37 are at the outward limit of their throw, as at the upper side of Fig. 3, and incapable of exerting propelling force, the other link 37 is almost at right angles to crank 38 and in position to exert direct propelling force—much more so than though said link were more nearly parallel to the crank.

To prevent the meter from running backward, the pivoted counterweighted latch 47 is mounted on bridge 43 and simply turns down when arm 38 passes thereover, as in dotted lines in Fig. 9, but if the arm should start to move in a reverse direction the latch would form a positive obstruction, as will be understood.

Pin 40' projects upwardly from the adjustable link connection 40 and engages crank 48 of arbor 49 which extends upwardly through the top of the meter for operating the registering mechanism, not shown.

I claim:

1. In a gas meter, a casing having a delivery chamber, measuring chambers, and an outlet chamber, a valve seat for the delivery chamber having ports open to each of the measuring chambers and a port open to the outlet chamber, a valve actuating crank, an arm extending from the valve a distance greater than the distance between the valve and crank in any position, and a link connecting the extended portion of the arm and the crank.

2. In a gas meter, a casing having a delivery chamber, measuring chambers, and an outlet chamber, chamber controlling valves, arms extending from the valves and crossing each other, a valve actuating crank, means connecting the crossed arms with said crank, and crank actuating means.

3. In a gas meter, a body having a delivery chamber, measuring chambers, and an outlet chamber, movable diaphragms, a valve seat having ports extending to each of the measuring chambers and to the outlet chamber, valves controlling communication between said ports, flag rods and means operatively connecting the rods to the diaphragms, arms projecting from said rods and crossing each other, a crank, connections between said crank and said crossed arms, arms extending from the valves and crossing each other, and connections between the last mentioned crossed arms and said crank.

4. In a gas meter, two casings or body parts fitting together to inclose two measuring chambers, a rigid partition secured between the meeting faces of the casing parts and separating the measuring chambers with an opening formed through said partition, a flexible diaphragm, and means securing the diaphragm to the partition around said opening.

5. In a gas meter, two measuring-chambers, a flexible diaphragm separating the chambers, a flag rod, an arm projecting from the flag rod, a bracket secured to the diaphragm and having a bearing on the flag rod arm, arms carried by said bracket and projecting in opposite directions from a vertical line intersecting said bearing, and a two-arm guide mounted to swing in a fixed path in the direction in which the diaphragm moves with the arms of said guide in sliding engagement with the oppositely extending arms carried by said bracket.

In testimony whereof I affix my signature in presence of two witnesses.

JAMES R. ARMSTRONG.

Witnesses:
J. M. NESBIT,
F. E. GAITHER.